US012292966B2

(12) United States Patent
Lowry

(10) Patent No.: US 12,292,966 B2
(45) Date of Patent: May 6, 2025

(54) SYSTEMS AND METHODS FOR FOLDER AND FILE SEQUESTRATION

(71) Applicant: Bret Douglas Lowry, Sarasota, FL (US)

(72) Inventor: Bret Douglas Lowry, Sarasota, FL (US)

( * ) Notice: Subject to any disclaimer, the term of this patent is extended or adjusted under 35 U.S.C. 154(b) by 389 days.

(21) Appl. No.: 17/848,014

(22) Filed: Jun. 23, 2022

(65) Prior Publication Data

US 2023/0418933 A1   Dec. 28, 2023

(51) Int. Cl.
*G06F 21/00* (2013.01)
*G06F 21/54* (2013.01)
*G06F 21/56* (2013.01)

(52) U.S. Cl.
CPC .............. *G06F 21/54* (2013.01); *G06F 21/56* (2013.01)

(58) Field of Classification Search
CPC .......... G06F 21/56; G06F 21/54; G06F 21/00; G06F 21/50; H04L 63/14
USPC .......................................................... 726/22
See application file for complete search history.

(56) References Cited

U.S. PATENT DOCUMENTS

| | | | |
|---|---|---|---|
| 8,234,477 B2 | 7/2012 | Shaath | |
| 8,572,758 B1 | 10/2013 | Clifford | |
| 9,760,715 B2 | 9/2017 | Rothwell | |
| 9,858,416 B2 | 1/2018 | Niemela et al. | |
| 10,083,300 B2 | 9/2018 | Thakar et al. | |
| 10,291,634 B2 * | 5/2019 | Arzi ..................... | H04L 63/1408 |
| 10,783,239 B2 | 9/2020 | Woodworth, Jr. | |
| 10,873,588 B2 | 12/2020 | Woodworth, Jr. | |
| 11,381,578 B1 * | 7/2022 | Manni ................... | G06F 21/567 |
| 2002/0174010 A1 * | 11/2002 | Rice, III ............... | G06F 16/182 |
| | | | 705/14.67 |
| 2005/0154885 A1 * | 7/2005 | Viscomi ............. | G06F 21/6218 |
| | | | 713/165 |
| 2008/0294586 A1 * | 11/2008 | Lim ........................ | H04L 63/20 |
| | | | 726/4 |
| 2011/0209196 A1 * | 8/2011 | Kennedy ................ | G06Q 30/02 |
| | | | 726/1 |
| 2012/0073482 A1 * | 3/2012 | Meeker .................. | E05B 47/00 |
| | | | 109/23 |
| 2017/0201425 A1 * | 7/2017 | Marinelli ................ | H04L 41/12 |
| 2018/0189300 A1 | 7/2018 | Shaath | |
| 2019/0260740 A1 | 8/2019 | Riley | |
| 2020/0117801 A1 | 4/2020 | Thomas | |
| 2022/0147628 A1 * | 5/2022 | Abu Alhaol ........... | G06N 3/045 |

\* cited by examiner

*Primary Examiner* — Josnel Jeudy
(74) *Attorney, Agent, or Firm* — Edward M. Livingston; LIVINGSTON LAW, P.A.

(57) ABSTRACT

Systems and methods for providing sequestration of files and folders on a need-to-know basis based on the actions associated with file extensions and folder names by detecting whether a portable executable (PE) attempting to access a protected file or folder by use of a monitoring library is allowed to have access and taking appropriate action to allow or deny access.

20 Claims, 9 Drawing Sheets

SYSTEMS AND METHODS FOR FOLDER AND FILE SEQUESTRATION

FIELD OF THE DISCLOSURE

This disclosure generally relates to systems and methods for sequestration of folders and files. In particular, the disclosure is directed to systems and methods for taking protective actions when an untrusted application attempts to access a protected folder or a file.

BACKGROUND OF THE DISCLOSURE

Proprietary files and data can become a target of corporate espionage, ransomware, or virus attacks thru a multitude of different attack vectors that involve getting software to run on a target's computer. For corporate espionage, the goal is to harvest and remove as many documents and data as possible before being discovered and hopefully without discovery. Some espionage attacks have taken place over more than a year, silently discovering data and removing it, before the attack itself is discovered. Ransomware and virus attacks on the other hand tend to be quick and direct, attempting to encrypt file systems, folder and/or files, including database files. For example, an unsuspecting user may be tricked by a targeted email to browse to a webpage deliberately infected with ransomware that either performs malicious actions when accessed or prompts the user to execute a malicious program that then installs itself onto the targeted computer where it can subsequently harvest data at leisure or at a given point in time, start encrypting files.

In general, there are a number of anti-ransomware technologies that attempt to protect computers before they get infected by cybersecurity attacks, such as drive-by infections from infected webpages. These anti-ransomware technologies are effective to a point, but quite often fail in their mission to protect business assets. All too often, we hear about successful attacks where companies must decide between paying 10's and 100's of thousands of dollars in ransom or attempt to recover their files from backups. One of the reasons for this is traditional software security programs attempt to block software based on signatures of previous infections or other characteristics they've gathered over time, without regard for what programs are doing once running. Their detections are traditionally signature based and therefore quite often miss Zero Day threats; a threat newly introduced into the wild. If malware and/or ransomware can successfully run, it will generally succeed in in its mission to steal and/or encrypt some or lots of proprietary data before it is discovered.

The landscape of infections is changing and evolving quickly with malware authors finding a hole in an organizations security and then exploiting it to infect a company's entire network, possibly resulting in multiple, if not all, computers becoming infected with ransomware capable of stealing and then encrypting select file types or every interesting file it encounters on an infected computer. For example, malware authors took advantage of a vulnerable API in a credit card processing machine. They were able to infect both the card processing machine and the computer that received data from the card processor. From there, the malware authors were able to access the computers controlling all credit card processing at all of the retailers stores and eventually gained access to the stores corporate backend systems, stealing untold amounts of propriety data before they were eventually discovered. It was estimated that this attack went on for about a year before it was discovered. In another example, Log 4J, an open-source logging utility widely used in Java and JavaScript application that runs on over 3 billion devices around the world contained a vulnerability which allowed hackers to insert code into running applications that could perform virtually any task on the running computer the hackers desired, including accessing company assets in any folder, copying, encrypting and even deleting those same company assets. To make matters even more dangerous, web-based applications contain an average of 106 open-source components containing on average 23 vulnerabilities according to SonaType.com. This means, software that might appear safe today could be leveraged by hackers to perform an attack tomorrow. Normally, bugs can be repaired in weeks or months, but experts widely agree that the Log 4j vulnerability will crop up for years to come.

To minimize these vulnerabilities and possibly eliminate the success of attacks like described above, a file/folder sequestration system that protects individual files/folders at a granular level is needed to quickly identify and stop unauthorized access to business assets from all but authorized programs. In essence, allowing access to business assets on a need-to-know basis.

BRIEF SUMMARY OF THE DISCLOSURE

While anti-ransomware and antimalware technologies may be used to prevent ransomware and malware attacks, they have proven themselves time and again to be ineffective against zero-day attacks, meaning attacks they have never seen before. Sometimes, even minor tweaks to existing malware or ransomware render many security engines defenseless against the modified malware. These ongoing issues with traditional security products often leave businesses with gaping holes in their security defenses.

The present solution addresses the above-described need by directly protecting the assets Ransomware and Malware authors covet most, an organization's proprietary business assets. The present solution enables security at the file system level, folder level and file level by providing a way of protecting against nefarious programs and by collecting and analyzing the information that the system and methods of this invention yields to in turn improve the protection provided by the systems and methods.

The present solution provides a system which notifies both users and administrators with respect to securing the file system, folders and files. In contrast from anti-ransomware and antimalware which protect the computer and its perimeter from processes, the system protects the file system and specified folders and files from unwanted actions by any unauthorized executable. In some embodiments, but not all, the system notifies users and/or administrators with respect to actions taken by nontrusted programs. The system either pauses execution of these actions and prompts the user and/or administrator whether to allow the action or terminate the process or simply terminates the process if pre-directed to do so based on administrative settings.

Methods, system and apparatus are provided in which a system provides a user interface to confirm whether to take action terminating an untrusted process associated with an unauthorized action. A device driver monitors the start-up of all processes. In response to this monitoring, the driver detects the creation of a new process indicating an application was launched and injects the sequestration library into the process. Once injected, the sequestration library detects if the application is attempting to encrypt or purge the file system or access a protected folder or file in any way, and immediately suspends the process and notifies a background service which raises a prompt, based on administrative setting, alerting the user and/or all listening administrator devices to the action. The background service then listens for a response from the user and/or administrator on whether or not to allow the action or terminate the process. Once this decision has been made, it is recorded to a remote server prior to the action taking place.

In some embodiments, but not all, the present solution provides a method for providing a user interface to confirm whether to allow the action or terminate the process taking the action. The method may include any of the flowing steps, processes or action:

monitoring of process creation, termination by a driver in a device.

determination by the driver, utilizing data provided by the Sequestration Core, whether or not to monitor the given process.

injection, by Sequestration Injector, of monitoring code into newly created process detecting, by the Sequestration monitoring code, that an application attempted to access a protected business asset for which it does not have permission to access notification, by the Sequestration monitoring code, to the Sequestration background service of the monitored processes actions.

suspension, by the Sequestration monitoring code, of the monitored process notification, by the Sequestration monitoring code to the Sequestration background service of the suspended process and its actions.

notification, by the Sequestration background service, of the suspended process and its actions to the Sequestration User Service and Sequestration Central Services.

displaying, by the Sequestration User Service and Administrators App of a user interface, containing the name of the program, the file it was attempting to access and the manner in which it was trying to access the file. The user interface will wait for a user response as to whether or not to allow the action, all the while the application process in question remains suspended notification to the Sequestration Central Servers of the notification and the final disposition selected by the user and/or administrator.

notification, by the Sequestration User Service, of user response to Sequestration background service so it can then notify the Sequestration monitoring library to allow the action, block the action or terminate the process.

In some implementations, receiving input via the Sequestration User Interface from the user may include a response to allow the intercepted action, allowing the application to continue to proceed with the intercepted action. In some implementations, receiving input via the Sequestration User Interface from the user may include a response to disallow the intercepted action, resulting in the blocking of the intercepted action, raising a failure to the application. In some implementations, receiving input via the Sequestration User Interface from the user may include a response to terminate the suspended application and all associated processes.

In some implementations, methods may include the monitoring of when a folder is accessed, by the Sequestration monitoring code. In some implementations, methods may include, by the monitoring code, the ability to remove protected folder names from the list of folders in the parent folder to prevent unauthorized applications from "seeing" the folders exist, basically allowing the viewing of the folders on a Need-To-Know basis. In some implementations, methods may include, by the monitoring code, the ability to remove protected file names from the list of files in a given folder to prevent unauthorized applications from "seeing" the files exist, thus allowing the knowledge that a file exists on a Need-To-Know basis.

In some implementations, but not all, processes may include a method for notifying the administrator of an action taken by an application rather than and end-user. In some implementations, an Administrator Admin App will receive notification of an action taken by an application, the administrator will then be able to allow the action, resulting in the application on the client computer resuming the action. In some implementations, receiving input via the Administrators Admin App from the Admin may include a response to disallow the intercepted action, resulting in the blocking of the intercepted action by raising a failure to the application. In some implementations, receiving input via the Administrators Admin App from the Admin may include a response to terminate the suspended application and all associated processes.

In some aspects, the present solution provides for a system for providing a user interface to an end-user, administrator or both to confirm whether to allow, block or block and terminate an application based on an action taken. The system may in include all of the following components, modules or executable instructions:

An operating system appropriate device driver, registered in the operating system of a device and configured to monitor process creation/termination;

An operating system appropriate client library, utilized by the device driver, configured and capable of receiving messages from the driver executable and capable of determining whether or not a given process needs to be monitored.

a 64-bit injector process, configured to and capable of injecting the monitoring code into a given 64-bit process for the purpose of monitoring that 64-bit process.

a 32-bit injector process, configured to and capable of injecting the monitoring code into a given 32-bit process for the purpose of monitoring that 32-bit process.

When 128, 256 and other bit processors become available, an injector process for the appropriate bit of the process discovered will be made available.

A 64-bit monitor library, configured to and capable of monitoring 64-bit processes, capable of pausing, resuming and terminating a monitored process on demand.

A 32-bit monitor library, configured to and capable of monitoring 32-bit processes, capable of pausing, resuming and terminating a monitored process on demand.

When 128, 256 and other bit processors become available, a monitor library for the appropriate bit of the process discovered will be made available.

An operating system appropriate core library, configured to and capable of creating shared memory to accomplish bi-directional communication with the monitored libraries injected into the monitored applications and capable of communicating with a user service running on user space.

a user level application, running as a service on the device, configured to and capable of communicating with the core library and Server to act upon actions detected and configured to display and react to prompts to signal the monitored program via the core allow the action, block the action or block the action and terminate the process based on input an Administrators App, running on a device, configured to and capable of communicating with the Sequestration central servers on the web to act upon notifications for actions detected and configured to display and react to prompts to signal the monitored program via the central servers and the core to allow the action, block the action or block the action and terminate the process, lock the workstation or remote the workstation from the network based on input.

In some implementations, the monitoring library is further configured to automatically take the action specified by the administrator for a given action without notification to the end-user or the raising of a prompt. In some implementations, the driver is configured to identify processes initiated from a trusted application. In some implementations, the monitoring library is configured to associate descendent processes with an ancestral process, inheriting the permissions from its parent, grandparent or great grandparent process. In some implementations, the monitoring library is configured to request the user service, lock the device given certain actions are initiated by an untrusted application. In some implementations, the monitoring library is configured to request the user service automatically lock down the device and disconnect the device from the network given certain actions are initiated by an untrusted application.

In some implementations, the decision to pause or resume an application by the monitor library is in response to commands from the core library, originating from the user service. In some implementations, the user service is further configured to receive from a server a predetermined list of applications identified as trusted applications. In some implementations, the monitoring library is configured to receive a list of trusted applications from storage in the user service on the device, in assisting in predetermining trusted applications and processes. In some implementations, the administrator will modify the settings received from the Sequestration central servers prior to releasing the data for use by the monitoring library.

In some aspects, the present solution is directed to a method for automatically providing a response to resume, block or block and terminate a process based on a given action. The method may include any of the following actions, steps or processes:

An operating system appropriate device driver, registered in the operating system of a device and configured to monitor process creation/termination;

An operating system appropriate client library, utilized by the device driver, configured and capable of receiving messages from the driver executable and capable of determining whether or not a given process needs to be monitored.

a 64-bit injector process, configured to and capable of injecting the monitoring code into a given 64-bit process for the purpose of monitoring that 64-bit process.

a 32-bit injector process, configured to and capable of injecting the monitoring code into a given 32-bit process for the purpose of monitoring that 32-bit process.

When 128, 256 and other bit processors become available, an injector process for the appropriate bit of the process discovered will be made available.

A 64-bit monitor library, configured to and capable of monitoring 64-bit processes, capable of pausing, resuming and terminating a monitored process on demand.

A 32-bit monitor library, configured to and capable of monitoring 32-bit processes, capable of pausing, resuming and terminating a monitored process on demand.

When 128, 256 and other bit processors become available, a monitor library for the appropriate bit of the process discovered will be made available.

An operating system appropriate core library, configured to and capable of creating shared memory to accomplish bi-directional communication with the monitored libraries injected into the monitored applications and capable of communicating with a user service running on user space.

a user level application, running as a service on the device, configured to and capable of communicating with the core library and Server to act upon actions detected and configured to automatically signal the monitored program via the core to allow the action, block the action or block the action and terminate the process based on predetermined settings obtained from the external Sequestration Services In some implementations, the action is taken by a descendent process to a known process, possibly initiated by a web browser as a result of a user navigation.

BRIEF DESCRIPTION OF THE DRAWINGS

The foregoing and other objects, aspects, features and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computer environment which may be useful for practicing embodiments described herein.

Section B describes embodiments of systems and methods for the purpose of sequestering files and folders based on actions associated with file extensions and folder names.

A. Computing and Network Environment

Figure 1A:
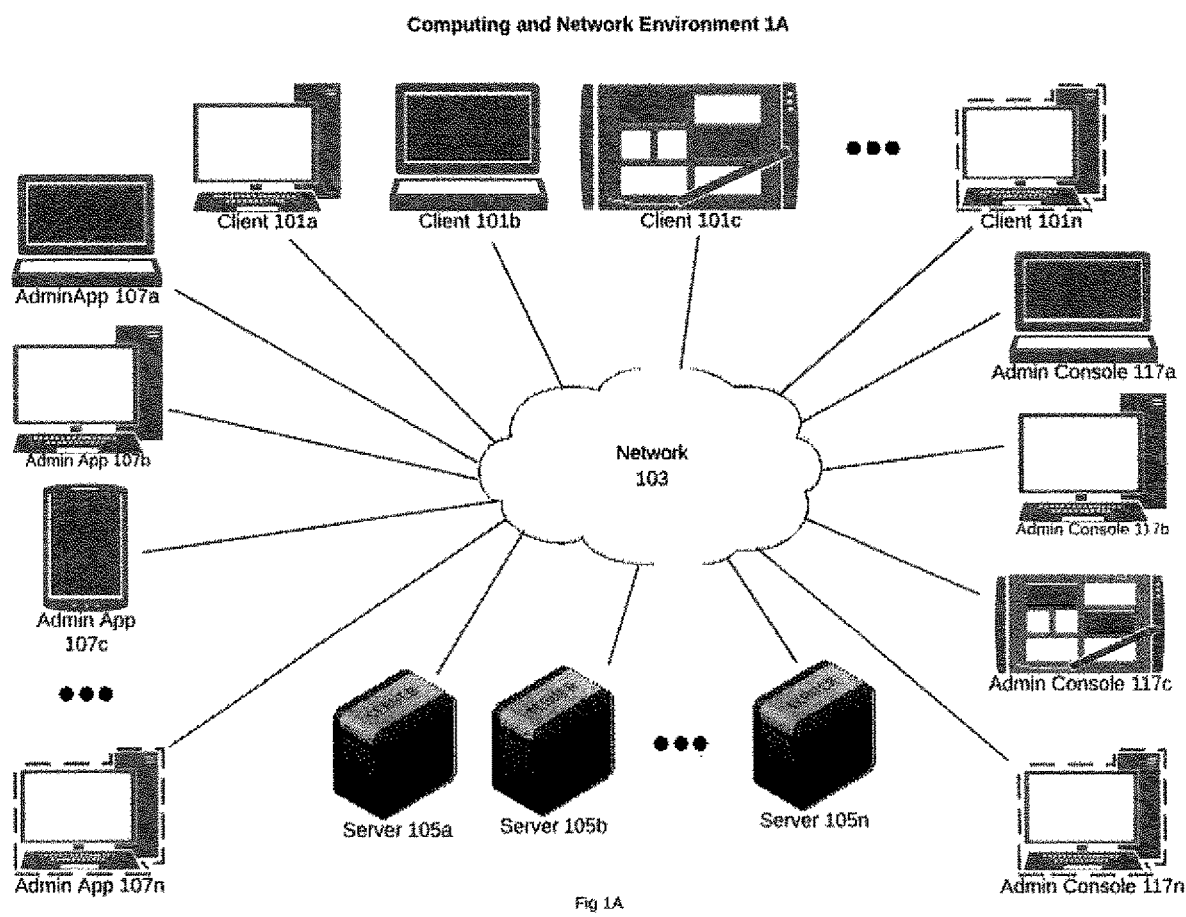
FIG. 1A is a diagram which depicts embodiments comprising of client devices in communication with local server devices.

Prior to discussing the specific embodiments of the present solution, it will be helpful to describe the operating environment, as well as, system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 105a-105n (also generally referred to as server(s) 105, node 105, or remote machine(s) 105) via one or more networks 103. In some embodiments, a client 101 has the capacity to function as both a client node seeking access to resources provided by a server and as a server providing access to hosted resources for other clients 101a-101n.

Although FIG. 1A shows a network 103 between the clients 101 and the servers 105, the clients 101 and the servers 105 may be on the same network 103. In some embodiments, there are multiple networks 103 between the clients 101 and the servers 105. In another of these embodiments, a network 103 may be a private network or a public network.

The network 103 may be connected via wired or wireless links. The wireless links may include any cellular network standards among mobile devices, including 1G, 2G, 3G, 4G, 5G and others as such are invented and conforming to the standards set forth for each.

The network 103 may be any type and/or form of network with the geographical scope of the network varying widely. Networks could include local-area networks (LAN), e.g., Intranet, metropolitan area networks (MAN), wide area networks (WAN), e.g., the Internet.

In some embodiments, the system may include single or multiple, logically-grouped servers 105. In one of these embodiments, the local group of servers 105 may be referred to as a server farm (not shown). In another embodiment, the servers 105 may be geographically dispersed. In other environments, the server farms include a plurality of server farms. The servers 105 within each server farm can be heterogeneous, utilizing a Windows based operating system or another operating system like Linux or Mac OSX.

Figure 1B:
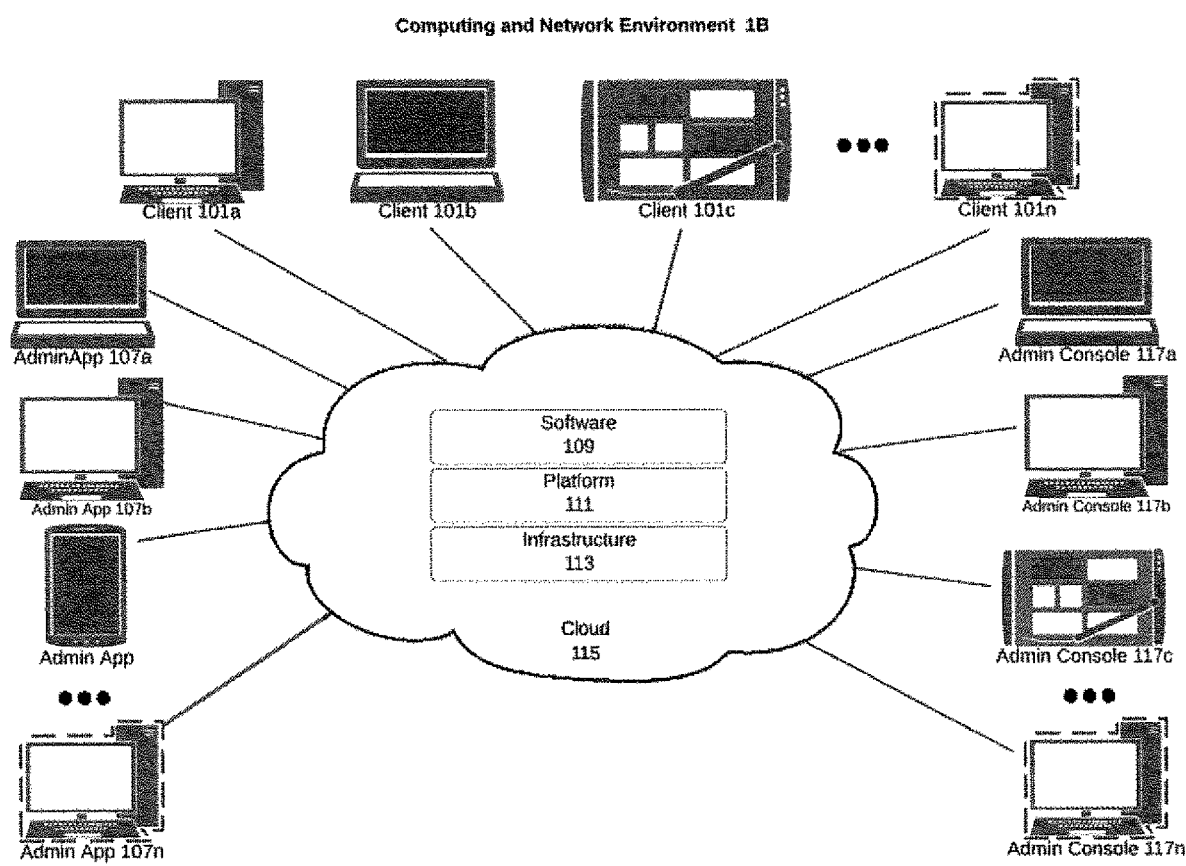
FIG. 1B is a diagram which depicts a cloud computing environment comprising of client devices in communication with cloud service providers.

Referring to both FIG. 1A and FIG. 1B, the clients 101a-101n may consist of devices including workstations, laptops, tablets or other running a Windows based, Linux based or Mac OSX based operating system. Client 101a-101n may be physical devices or virtual environments like those available in a Citrix or Azure environment capable of running a client operating system that is made available to remote terminal sessions.

Referring to both FIG. 1A and FIG. 1B, the admin app 107a-107n is an app capable of running multiple environments such as Windows, Linux, IOS, Android and other. This app is capable of receiving notifications originating on clients (101a-101n) and raising alerts to which the administrator can respond, in order to control the action taken by the client in response to an action initiated by a PE on any protected folder or file.

Referring to both FIG. 1A and FIG. 1B, the admin console is the software administrators utilize to configure their Sequester environment. In this environment, an administrator can set file types for protection, set permissions for which PE can access which files types and in what manner, can create client installation packages for distribution to clients (101a-101n), view recommendations based on actions from other administrators and independent analysis of PE blocked on a client.

Referring to FIG. 1B, a cloud computing environment is depicted. A cloud computing environment may provide client 101 with one or more resources provided by a network environment. The cloud computing environment may include one or more clients 101a-101n, in communication with a cloud 107 over one or more networks 103. Clients 101 may include, e.g., thick clients, thin clients, and zero clients. A thick client may provide at least some functionality even when disconnected from the cloud 107 or servers 105. A thin client or a zero client may depend on the connection to the cloud 107 or server 105 to provide functionality. A zero client may depend on the cloud 107 or other networks 103 or servers 105 to retrieve operating system data for the client device 101. The cloud 107 may include backend platforms, e.g., servers 105, storage, server farms or data centers.

Figure 2A:
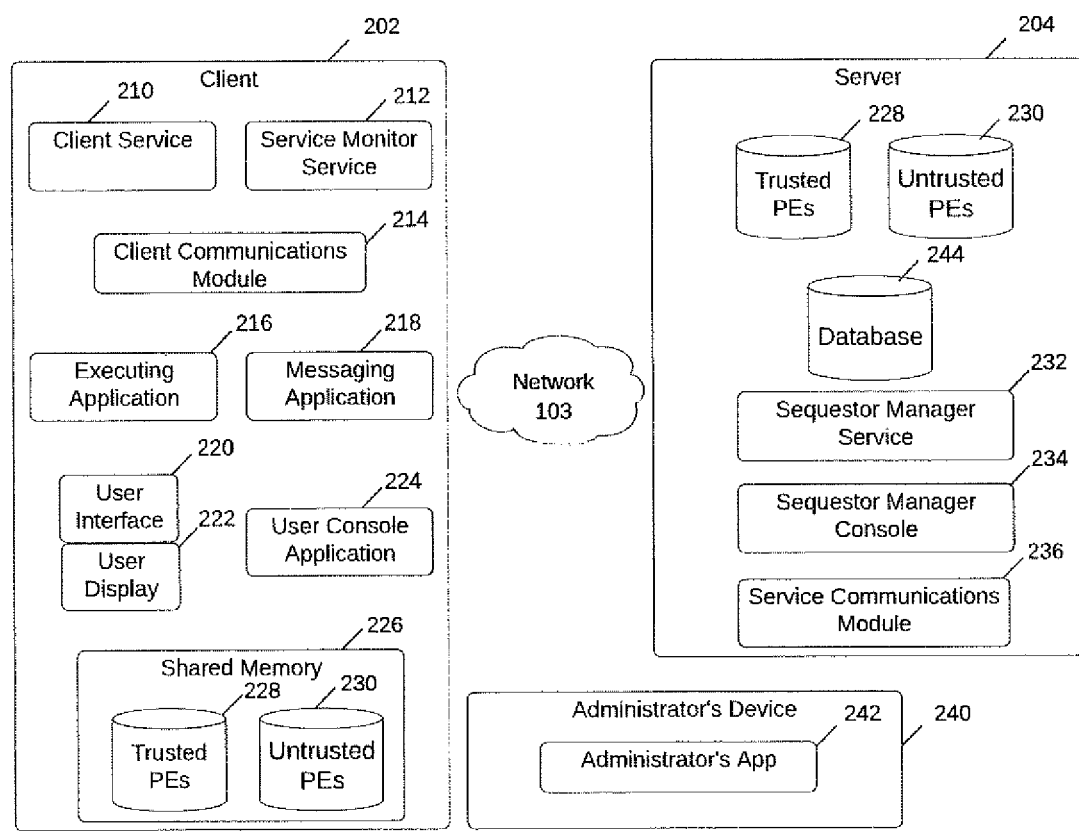
FIG. 2A depicts some of the architecture of an implements of a system, such as in FIG. 1A, which includes a server, a client device and a network configured to provide user interfaces based on sequestration actions associated with file/folder access by untrusted PE.
Figure 2B:
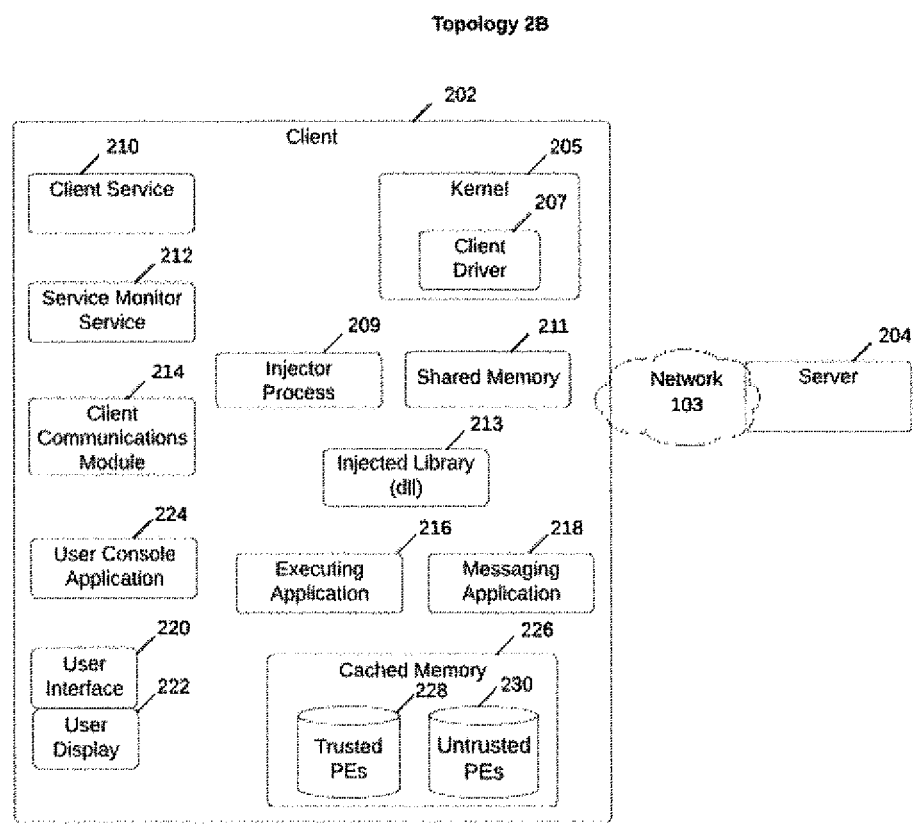
FIG. 2B depicts a detailed view of the architecture of the client device of FIG. 2A with respect to the network and the server of FIG. 2A.

Referring to FIG. 2A in a general overview, FIG. 2A depicts some of the architecture of an implementation of a system 200 capable of identifying any unauthorized portable executable or child process from accessing a protected business asset, raising a prompt whether to review or take an action and ultimately terminating upon request any portable executable associated with any of the following: (1) attempting to open a business asset (file or folder) to which the it does not have permissions (2) attempting to save and thus alter/encrypt a protected business asset to which it is unauthorized to save (3) attempting to delete a protected business asset to which it does not have permission to delete.

System 200 includes a server 204. The server 204 includes a sequester manager service 232, sequester manager console 234 and sequester communications module 236. The server 204 includes several storage modules. Trusted portable executables are stored in storage 228, untrusted portable executables are stored in storage 230.

Each of the server 204, sequester manager service 232, sequester manager console 234 and sequester communications module 236 may comprise a program, service, task, script, library, application or any type and form of executable instructions or code executable on one or more processors. Any of the server 204, sequester manager service 232, sequester manager console 234 and sequester communications module 236 may be combined into one or more modules, applications, programs, services, tasks, scripts, libraries, applications, or executable code.

System 200 includes a client 202. The client 202 includes a client service 210, service monitor service 212, client communications module 214, executing application 216, messaging application 218, user console application 224, user interface 220, user display 222, shared memory 226 containing trusted portable executables in storage 228 and untrusted portable executables in storage 230.

System 200 includes a network 103. The network may be may be public, private, or hybrid. Public networks may include public servers 204 that are maintained by third parties to the clients 202 or the owners of the clients 202. The servers 204 may be located off-site in remote geographical locations as disclosed above or otherwise. Public networks may be connected to the servers 204 over a public network. Private networks may include private servers 204 that are physically maintained by clients 202 or owners of clients 202. Private networks may be connected to the servers 204 over a private network 103. Hybrid networks 103 may include both the private and public networks and servers 204.

Each of the client 202, client service 210, service monitor service 212, client communications module 214, executing application 216, messaging application 218, user console application 224 may comprise a program, service, task, script, library, application or any type and form of executable instructions or code executable on one or more processors. Any of the client 202, client service 210, service monitor service 212, client communications module 214, executing application 216, messaging application 218, user console application 224 may be combined into one or more modules, applications, programs, services, tasks, scripts, libraries, applications, or executable code.

System 200 includes an administrator's device 240. The administrator's device 240 contains an administrator's app 242.

Each of the administrator's device 240, administrator's app 242 may comprise a program, service, task, script library, application or any type and form of executable instructions or code executable on one or more processors.

In an implementation, system 200 includes a server 204. The server 204 may be a part of a cluster of servers 204. In some embodiments, tasks performed by the server 204 may be performed by a plurality of servers. These tasks may be allocated among the cluster of servers by an application, service, daemon, routine, or other executable logic for task allocation. The server 204 may include a processor and memory.

The sequester manager service 232 generally manages the process of sending/receiving data and information between the client 202 and the server 204, via the service communication module 236. For example, the client service 210 suspends an executing application 216, then interrogates shared memory 226, both the trusted portable executables 228 and untrusted portable executables 230 and does not find an entry for this particular portable executable. Client service 210, then sends a message to the messaging application 218 stating an unknown portable executable has attempted to save/encrypt file x. The messaging application 218 then sends a message to user console application 224 and service communications module 236 via the network 103. User console application 224, then raises an alert to the user display 222 and awaits an answer from user interface 220. Service Communications Module raises and alert to the administrator's device 240, administrator's app 242 and awaits a response. The administrator's app 242 response is sent back to the service communications module 236 which routes the message to a sequester manager service 232, which logs the response to the database 244 and sends a message back to the client 202, client communications module 214 via the service communications module 236 utilizing network 103. Client communications module 214 then sends messages to the client service 210 so that it can take the action specified in the administrator's app 242 and to the messaging application 218 so that it can notify the user console application 224 close the alert dialog on the user display 222 and raise an informational message on user display 222 indicating the action taken by the administrator from the administrator's app 242.

In some embodiments, the user logged into client 202 will respond to the alert prior to the administrator running the administrator's app 242. In this instance, the user console application 224 will notify the messaging application 218 of the response to the notification. The messaging application 218 then notifies the service communications module 236 via the network 103. Service communications module then notifies the sequester manager service 232 which logs the response to the database 244 and notifies the administrator's device 240, administrators app 242 to remove the prompt and raise an informational message stating the action taken by the client 202 in response to the alert. The messaging application 218 also notifies the client service 210 which takes the action requested by the client 202 via the client interface 220.

In some embodiments, upon notification user console application 224, raises an informational message informing the user of the actions of the portable executable rather than a dialog to which they can respond. The user must wait for the administrator to reply to the alert raised in the administrator's app 242 for the alert to be remedied.

In some embodiments, upon notification the service communications module is instructed not to raise dialog to which the administrator can respond on the administrator's app 242. The user must answer the prompt raised on their user display 222 via the user interface 220 for the event to be resolved.

In some embodiments, where the administrator has configured sequester to run in an automated manner, auto-pilot mode, no dialogs are raised upon a client service 210 detecting an unknown portable executable performing an unauthorized action. Instead, client service 210 takes the default action the administrator has assigned to such an even, allow, block or block and terminate. Allowing such events is extremely useful during the discovery process at many locations, where nefarious activity is not yet suspected, for a period of time post-installation to minimize impact on end-users while determining what applications are actively used in the organization. All events still traverse through to the sequester manager service 232 and are logged to the database 244.

In order to accomplish secure communications between the client 202, client communications module 214 and the server 204, service communications module 236, secure interfaces must be established.

Definition of the API's as follows:

Installed

This API is used to indicate the fact that second chance was installed. This should be called every time sequester is installed on an individual computer.

Method: POST

Path: /v1/sequester/installed

Parameters: Only the required parameters above

Response Code: 201

Response Body: JSON response echoing required parameters

```
{
    "data": {
        "sequseter_version":"1",
        "machine_guid":"1",
        "os_architecture":"1",
        "os_locale":"1",
        "os_name":"1",
    }
}
```

Uninstalled

This API is used to indicate the fact that second chance was uninstalled. This should be called every time sequester is uninstalled on an individual computer.

Method: POST

Path: /v1/sequester/uninstalled

Parameters: Only the required parameters above

Response Code: 201

Response Body: JSON response echoing required parameters

```
{
    "data": {
        "sequester_version":"1",
        "machine_guid":"1",
        "os_architecture":"1",
        "os_locale":"1",
        "os_name":"1",
        "outlook_version":"1",
    }
}
```

Log Event

This API is used to indicate the fact that second chance was uninstalled. This should be called every time sequester is uninstalled on an individual computer.

Method: POST

Path: /v1/sequester/uninstalled

Parameters: Only the required parameters above

Response Code: 201

Response Body: JSON response echoing required parameters

```
{
    "data": {
        "sequester_version":"1",
        "machine_guid":"1",
        "message": {
            "type":"1",
            "data":"1",
        }
    }
}
```

Action Taken

This API is used to allow logging of the response along with generating an informational message to either the client or administrator of the action taken by the other party to a prompt. This should be called every time second chance raises an event that a ShellExecEX( ) is opening a URL.

Additional Outgoing values

| Parameter | Description |
| --- | --- |
| Filename | Fully qualified path to file/folder in question |
| Suspect | Fully qualified path to PE performing action |
| Action | Domain parsed from the original URL |
| | 0 = Open |
| | 1 = Save |
| | 2 = Delete |
| Response | Response to the prompt |
| | 0 = Allow |
| | 1 = Block |
| | 2 = Block and Terminate |
| Disseminate | Disseminate this response to all clients |
| | 0 = No, response to local client only |
| | 1 = Yes, to all clients on same polity |
| | 2 = Yes, to all managed clients for aministrator |

| Parameter | Description |
| --- | --- |
| None | |

Method: POST

Path: /v1/sequestered/action_taken

Parameters: Only the required parameters above

Response Code: 201

Response Body: JSON response containing the current second chance settings.

```
{
    "data": {
        "filename":"c:\data.docx",
        "suspect":"c:\users\username\roaming\mfg\bad.exe",
        "action":"1",
        "response":"2",
        "disseminate":"0",
    }
}
```

B. Systems and Methods of Sequestering Files and Folders Based on Actions Associated with File Extensions and Folder Names.

This disclosure generally relates to systems and methods of sequestering of files and folders based on actions associated with file extensions and folder names.

Figure 3A:
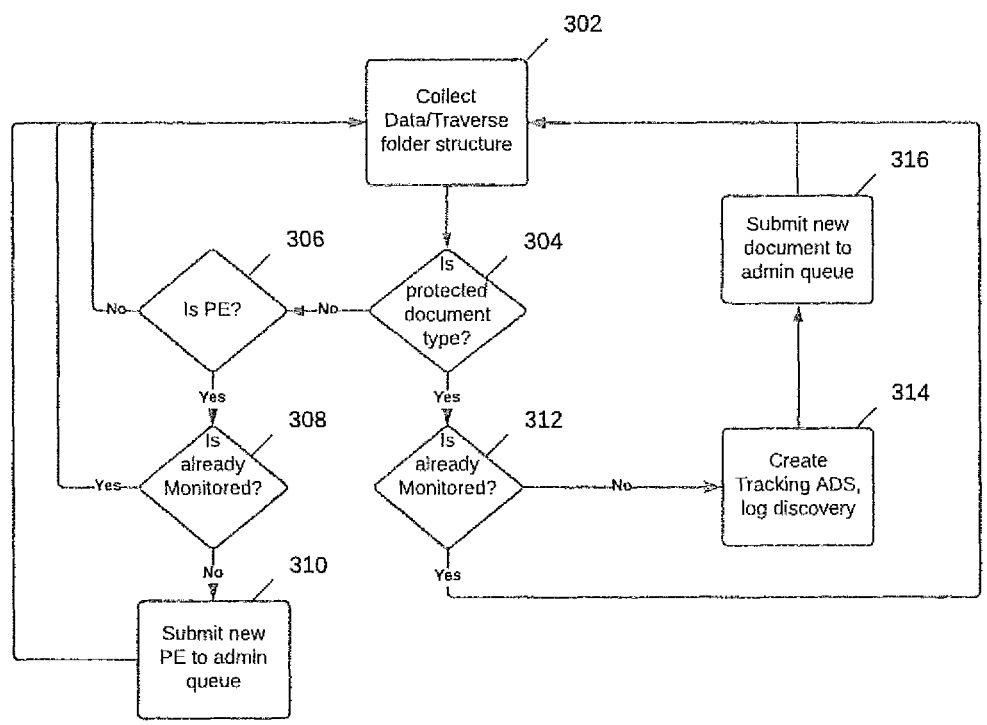
FIG. 3A depicts a detailed flow chart illustrating an example implementation of the system utilizing a discovery process to traverse the entire file system in order to enumerate all files of specific file types resident on the client.

In one embodiment, FIG. 3A, immediately after installation and registration of the software, the sequester agent reports back vital system information along with license keys/authentication token as follows:

| Parameter | Description |
| --- | --- |
| sequester_version | The version of the currently installed sequester system |
| os_name | Operating system name |
| os_version | Operating system version |
| os_architecture | Operating system architecture x32/x64 |
| os_locale | Operating system locale (numeric format) |
| machine_guid | Unique machine ID generated by the second chance system |

The method traverses all folders (302), on the computer, starting at the root folder, creating an inventory of all files by monitored file type (304) and a list of all portable executables (PE)(306), that reside on the computer. For example, immediately upon installation on a Windows computer, this method starts searching on the System drive, by default C:\ and traverses down each folder structure until the entire disk has been inspected. The method enumerates all files and folders located in the root of the system drive, cycling over them one by one to determine if the file is a PE (306), a monitored file type (304) or a subfolder to be traversed (302). If the file is a PE that has yet to be reported as residing on the local computer (308) discovery gathers telemetry about the PE and submits the telemetry the list of PE on the local computer and to the admin queue (310). The telemetry contains information such as name of PE, folder where it resides, code signing certificate, date created and last modified, manufacturer, signature and other information the administrator may find useful in determining if the PE should be allowed access to any of the monitored file types. This information is transmitted via an interface to the central servers in the cloud (115) where it is stored in a database and made available to the Administrator's Sequestration Console (117) a web interface capable of running in any modern browser If the file is one of the protected file types (304), as configured by the Administrator in the Sequestration Console, and has yet to be reported as residing on the local computer (312), discovery creates an alternate data stream in the file to aid in tracking the file, collects telemetry such as, file name, folder where it resides, author, date created and last modified, and other information the administrator may find useful about the protected file and logs that the file was discovered (314).

| Parameter | Description |
| --- | --- |
| Full path | Fully qualified path to the file |
| File name | Name of file. |
| File size | Operating system version |
| Device | System on which file was found |
| Author | Name file shows as the author |
| Hash | File hash |
| DateTime Created | Creation date/time from the file |
| DateTime Last Modified | Last updated date/time from the file |
| Current DateTime | Moment while file was discovered and telemetry was created |

The existence of the file and telemetry is reported back to the admin queue and transmitted to the central servers (316). Discovery determines if any additional drives exist local on the computer and traverses down each of those in turn until all local hard drives have been traversed and the contents cataloged and transmitted to the central server (115) and made available to the Administrator in the Sequestration Console (117).

In some aspects, a method provides for automatic protection of files based on the file types the majority of administrators are already protecting with Sequester. This automatic protection mode is available for administrators who do not have sufficient experience to self-configure their site in the Sequestration Console (117). The administrator can instruct Sequester to use the "recommended" configuration based on your pier's settings for Protected Files and then modify their settings once the best practices settings have been applied to their site.

In some aspects, a method provides for automatic assignment of which PE are allowed to access which file types based on data from third party sources, as well as, best practices data available from other Sequester Administrators. The administrator can instruct Sequester to use the "recommended" configuration based on industry knowledge of PE and your pier's settings for "Safe PE" and then modify their settings once the best practices settings have been applied to their site.

In some aspects, the protected file is automatically moved to a protected folder located on the local computer, as configured by the Administrator. For example, the Administrator configures the system to move all protected files to a folder under % UserData % Protected in an effort to improve security by placing all protected files under a single protected folder. The method will create the folder under an Administrator configured shortcut, following the original folder's naming convention. In other words, if the file was found in C:\BobsData\Project-A, the file would be moved to % shortcut %\BobsData\Project-A.

In some aspects, the protected file is automatically moved to a protected folder located on the local computer as described above. Once the file is successfully moved, a symbolic link pointing to the new location of the file is created to limit the impact on the end-user by moving files around on the computer they are using. A symbolic link looks like a file, but is actually a pointer to where the file is actually located.

All of this information if logged back to the central server so the administrator is aware of everything happening on their computers.

| Parameter | Description |
| --- | --- |
| Device | System on which the logged event took place |
| Event Type | FileMove |
| Original file location | Fully qualified path to original location. |
| New file location | Fully qualified path to new file location |
| MovedAt | Date Time move took place |

The present system and methods are capable of "listening" for various events initiated by the operating system. This listening can be accomplished via various methods. One method for listening for events such as the creation of a file is the use the Microsoft library, Detours which Microsoft makes available to developers so that they can easily monitor for many different events without having to hook the event itself. Another method to listen for these events is to manually hook the event and subsequently listening for the event to fire. Yet another way to accomplish this is the use facilities built into programming languages like C# where Microsoft has already provided methods in the C# framework which hook the event and provide the developer with a limited amount of flexibility in responding to the event and altering its data. There are also $3^{rd}$ party open-source libraries available like EasyHook or tools like HookMe from Microsoft that can be used to listen for particular events firing and intercepting their execution.

Events Sequester is listening for include the Folder Open event. When the Folder Open event fires (402), Sequester intercepts that event and interrogates the metadata in the even to determine if the folder that is about to be opened is a protected folder (404). If the folder is a protected folder, determine if the end user is allowed to open the folder (406), if so, log the successful open event (412). If the user is allowed to open the folder or if folder is not a protected folder, obtain a list of the contents of the folder (414). Cycle through the contents of the folder, if the folder or file contained in the opened folder is not a protected business asset (416), add the item to the list of objects that will be passed back from the folder open request (418). Determine if the contents of the folder are exhausted, if not continue to cycle through the contents (414), if is allow the open to proceed using the altered listed of items contained in the recently opened folder (422), the processing of this event is complete (424)

If the requester attempting to open the folder is not allowed to access that business asset, log the unsuccessful open attempt (408), return an empty list for the contents of the folder (408) and raise a folder not found error (410) to the process attempting to open the folder. The processing of this event is complete (424).

In another embodiment, administrators can configure Sequester to "ignore" the actions of trusted PEs, like those of AntiMalware, to ensure Sequester does not interfere in anyway with other security products or other PE of the Administrator's choosing.

In another embodiment, a method listens for the creation of a new PE, upon notification, sequester automatically assigns the administrator's settings, if possible, and alerts the administrator to the existence of the new/updated PE. Usually, product updates take place in a multi-step process which includes creating the program under a temporary file name prior to copying it into place or renaming it to the desired name. Many factors are considered in granting "allowed" permissions to an upgraded PE, factors such as full verification of code signing certificate, signature, manufacturer and other factors including information derived via external sources. This update is transmitted to the central server, stored in the database and made available to the Administrator via the Sequestration Console. This action is also logged into the Sequester event logs.

Figure 4A:
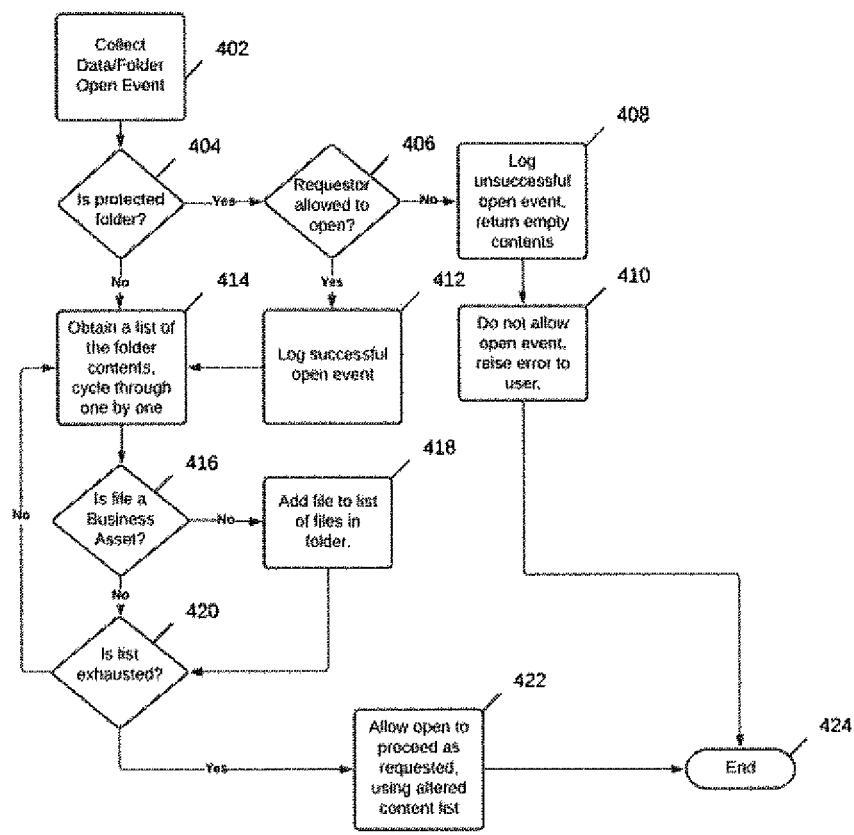
FIG. 4A depicts a detailed flow chart illustrating an example implementation of the system utilizing the Open Folder event raised by the Operating System, in order to intercept this action and filter out any folders the PE requesting this information is not configured to be able to access.

In another embodiment, a method listens for when a PE requests to open a folder, FIG. 4A. Upon receipt of the event, the method receives a list of contents of the folder the PE is requesting to open. First, the method verifies the PE is allowed to open the folder, if not, it returns a failure resulting in the PE being told the folder does not exist. This is important to ensure a nefarious PE is not attempting to access folders within the file system by generating random names, looking for hidden folders. Second, if the PE has permission to view the contents of the folder, the method looks at each folder and file within the folder in question, removing any items the PE does not have permission to view. If all items are removed, an empty dataset is returned making it appear the folder in question is empty. If items remain after removing protected items from the data, the dataset is returned to the calling program so that it can use the results. This action is logged into the Sequester event logs. Sequestering at this level is at the discretion of the administrator and can be activated from the Sequestration Administrative Console.

In some aspects, the administrator will configure the method to hide all protected files and folders from any unauthorized PE, this is the strongest security available for this method.

In some aspects, a method will terminate the unauthorized PE attempting to open the folder in question in response to its attempt to open the folder. In this case, message is raised to the end-user alerting them the action was not allowed, in addition, administrators are immediately notified of the program termination so they can review the legitimacy of the program and determine a course of action.

In some aspects, a method will terminate and disable the unauthorized PE attempting to open the folder in question in response to its attempt to open the folder. For example, if an unknown PE attempts to open a protected file, the method will terminate the unauthorized PE's process, then alter the PE so that it cannot run again. In essence, the file is quarantined. In this case, a message is raised to the end-user alerting them the action was not allowed, in addition, administrators are immediately notified of the program termination so they can review the legitimacy of the program and determine a course of action, including remove from quarantine and allowing the PE to access the protected files in question.

Administrators are able to view and manipulate disabled programs in quarantine from the Administrator Console. An Administrator can release the PE from quarantine, thus allowing it to run in the future, elect to keep the PE in quarantine, or quarantine the PE anywhere it may exist on all computers they manage.

In some aspects, the administrator will configure the method only to hide all protected files, while allowing protected folders to be seen without allowing access.

In some aspects, the administrator will configure the method not to hide any protected files or folders, instead relying on the system and methods to protect the business assets. This manner of protection is least secure because all folders and files are visible, but will limit confusion if a folder and/or file is visible from within one program but not from within another.

In some aspects, a method will terminate the unauthorized PE attempting to open the file in question in response to its attempt to open the protected file. In this case, a message is raised to the end-user alerting them the action was not allowed, in addition, administrators are immediately notified of the program termination so they can review the legitimacy of the program and determine a course of action.

In some aspects, a method will terminate and disable the unauthorized PE attempting to open the file in question in response to its attempt to open the file. Disabling a PE due to unauthorized file access presents the Administrator with the same options as disabling due to unauthorized folder access. In this case, a message is raised to the end-user alerting them the action was not allowed and that the program has been disabled until further notice, in addition, administrators are immediately notified of the program termination so they can review the legitimacy of the program and determine a course of action.

Figure 5A:
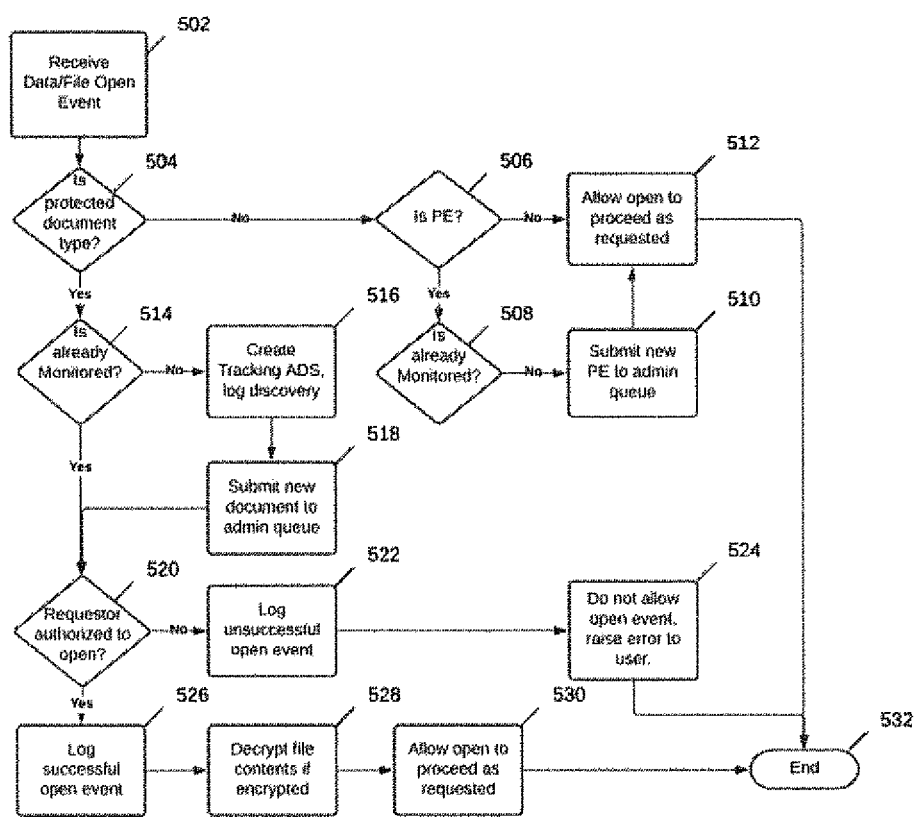
FIG. 5A depicts a detailed flow chart illustrating an example implementation of the system utilizing the Open File event raised by the Operating System, in order to intercept this action and disallow opening of the file in question by an unauthorized PE.

In another embodiment, a method listens for when a PE requests to open a file (FIG. 5A). Upon receipt of the file open event (502), the method receives the fully qualified path to the file. If the file is not of a protected file type (504) and is not of a PE type (506), the open event is allowed to proceed as requested and the processing of the event is complete (532). If the file in (506) is a PE, sequester then determines if the PE is already monitored (508), it not attributes of the file are collected and submitted to the admin queue (510), the open of the PE is then allowed to proceed as requested (512) and processing of the event is complete (532).

If the file the PE is attempting to open is of a protected file (504), but the file in question is not yet known to the system, the method generates the tracking alternate data stream, inserts it into the file and logs the existence of this file to the admin queue (518) so that this information is available to the Administrator Console.

Next, if it is determined that the requestor is authorized to open (520) the file. If the PE attempting to open it is not authorized to open a file of this type, the attempt to open the file is logged to the Administrator Console (522) and an Open Failed error (524) will be raised to the application and it will not be allowed to open the file in question. This action is logged into the Sequester event logs, if the file in question was a protected file (532).

If it is determined the PE is authorized to open the file in question (520), this action is logged to the Administrator Console (526), the contents of the file are decrypted (528) the decrypted data is returned on the open request and the open (530) is allowed to proceed as requested. The request is complete (532).

In some aspects, a method will terminate the unauthorized PE attempting to open the file in question in response to its attempt to open the protected file. In this case, a message is raised to the end-user alerting them the action was not allowed, in addition, administrators are immediately notified of the program termination so they can review the legitimacy of the program and determine a course of action.

In some aspects, a method will terminate and disable the unauthorized PE attempting to open the file in question in response to its attempt to open the file. Disabling a PE due to unauthorized file access presents the Administrator with the same options as disabling due to unauthorized folder access. In this case, a message is raised to the end-user alerting them the action was not allowed and that the program has been disabled until further notice, in addition, administrators are immediately notified of the program termination so they can review the legitimacy of the program and determine a course of action.

In another embodiment, a method listens for when a PE requests to delete a file. Upon receipt of the event, the method receives the fully qualified path to the file. If the file is a protected file and the PE attempting to delete it does not have permissions to delete a file of this type, a Delete Failed error will be raised to the application and it will not be allowed to delete the file in question. This action is logged into the Sequester event logs, if the file in question was a protected file.

In some aspects, a method will terminate the unauthorized PE attempting to delete the file in question in response to its attempt to delete the protected file. In this case, message is raised to the end-user alerting them the action was not allowed, in addition, administrators are immediately notified of the program termination so they can review the legitimacy of the program and determine a course of action.

In some aspects, a method will terminate and disable the unauthorized PE attempting to delete the file in question in response to its attempt to delete the protected file. In this case, message is raised to the end-user alerting them the action was not allowed, in addition, administrators are immediately notified of the program termination so they can review the legitimacy of the program and determine a course of action.

Figure 5B:
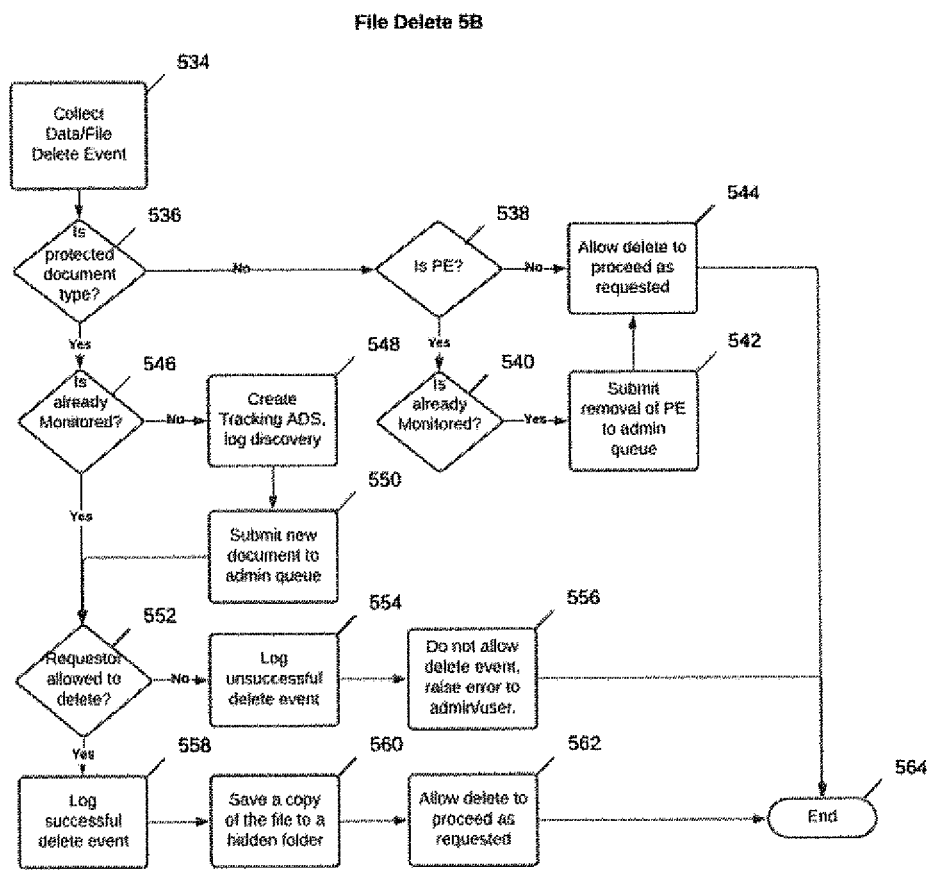
FIG. 5B depicts a detailed flow chart illustrating an example implementation of the system utilizing the Delete File event raised by the Operating System, in order to intercept this action and disallow deletion of the file in question by an unauthorized PE.

In another embodiment, a method listens for when a PE requests to delete a file (FIG. 5B). Upon receipt of the file delete event (534), the method receives the fully qualified path to the file. If the file is not of a protected file type (536) and is not of a PE type (538), the open event is allowed (544) to proceed as requested and the processing of the event is complete (562). If the file in (506) is a PE, sequester then determines if the PE is already monitored (540), it not attributes of the file are collected and submitted to the admin queue (542), the delete of the PE is then allowed to proceed as requested (544) and processing of the event is complete (564).

If the file the PE is attempting to delete is of a protected file (536), but the file in question is not yet known to the system (546), the method generates the tracking alternate data stream (548), inserts it into the file and logs the existence of this file to the admin queue (550) so that this information is available to the Administrator Console.

Next, if it is determined that the requestor is authorized to delete (552) the file. If the PE attempting to delete it is not authorized to delete a file of this type, the attempt to delete the file is logged to the Administrator Console (554) and an Delete Failed error (556) will be raised to the application and it will not be allowed to delete the file in question. This requested action is complete. (564).

If it is determined the PE is authorized to delete the file in question (552), this action is logged to the Administrator Console (558), a copy of the file is encrypted, compressed and stored in a hidden folder locally on the computer (560) the delete is then allowed to proceed as requested. (562) is allowed to proceed as requested. The request is complete (564).

In another embodiment, a method listens for when a PE requests to save a file. Upon receipt of the event, the method receives the fully qualified path to the file. If the file is a protected file and the PE attempting to save it does not have permissions to save a file of this type, a Save Failed error will be raised to the application and it will not be allowed to save the file in question. This action is logged into the Sequester event logs, if the file in question was a protected file.

In some aspects, a method will terminate the unauthorized PE attempting to save the file in question in response to its attempt to save the protected file. In this case, a message is raised to the end-user alerting them the action was not allowed, in addition, administrators are immediately notified of the program termination so they can review the legitimacy of the program and determine a course of action. In this case, message is raised to the end-user alerting them the action was not allowed, in addition, administrators are immediately notified of the program termination so they can review the legitimacy of the program and determine a course of action.

In some aspects, a method will terminate and disable the unauthorized PE attempting to save the file in question in response to its attempt to save the protected file. In this case, a message is raised to the end-user alerting them the action was not allowed, in addition, administrators are immediately notified of the program termination so they can review the legitimacy of the program and determine a course of action.

Figure 5C:
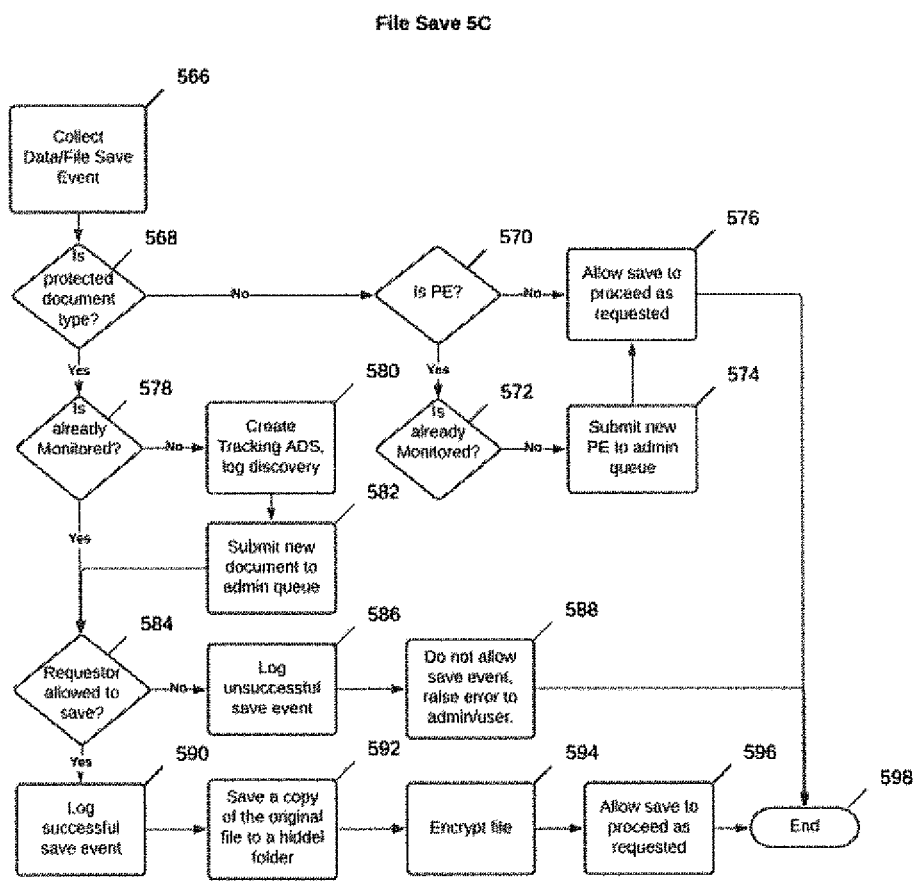
FIG. 5C depicts a detailed flow chart illustrating an example implementation of the system utilizing the Save File event raised by the Operating System, in order to intercept this actin and disallow saving of the file in question by an unauthorized PE.

In another embodiment, a method listens for when a PE requests to save a file (FIG. 5C). Upon receipt of the file save event (566), the method receives the fully qualified path to the file. If the file is not of a protected file type (568) and is not of a PE type (570), the save event is allowed (576) to proceed as requested and the processing of the event is complete (598). If the file in (570) is a PE, sequester then determines if the PE is already monitored (572), it not attributes of the file are collected and submitted to the admin queue (574), the delete of the PE is then allowed to proceed as requested (576) and processing of the event is complete (598).

If the file the PE is attempting to save is of a protected file (568), but the file in question is not yet known to the system (578), the method generates the tracking alternate data stream (580), inserts it into the file and logs the existence of this file to the admin queue (582) so that this information is available to the Administrator Console.

Next, if it is determined if the requestor is authorized to save (584) the file. If the PE attempting to save it is not authorized to save a file of this type, the attempt to save the file is logged to the Administrator Console (586) and a Save Failed error (588) will be raised to the application and it will not be allowed to save the file in question. This requested action is complete. (598).

If it is determined the PE is authorized to save the file in question (584), this action is logged to the Administrator Console (590), a copy of the file is stored in a hidden folder locally on the computer (592) the save is then allowed to proceed as requested. The contents of the file are encrypted (594) and the updated file is saved to its original location (596). The request is complete (598).

While various embodiments of the methods and systems have been described, these embodiments are exemplary and in no way limit the scope of the described methods or systems. Those having skill in the relevant art can effect changes to form and details of the described methods and systems without departing from the broadest scope of the described system and methods. Thus, the scope of the methods and systems described herein should not by limited by any of the exemplary embodiments and should be defined in accordance with the accompanying claims and their equivalents.

What is claimed is:

1. A system for providing sequestration of files and folders on a need-to-know basis based on the actions associated with file extensions and folder names, said system comprising:
   (a) monitoring, by a hardware processor on a computer, process execution of a portable executable (PE);
   (b) detecting, by monitoring library, that the PE is attempting to access a protected asset in a monitored manner;
   (c) immediate suspension of all processing for the PE in question;
   (d) intercepting, by the monitoring library the event of the action prior to the action taking place;
   (e) automatically determining disposition of the attempted file or folder and taking an automated action to allow, alter the list or terminate the PE;
   (f) in some instances, where a PE is accessing a file in a manner whereby the system is instructed to inquire as how to handle the event, displaying a user interface to receive an input whether to take the action, or block the action; and
   (g) resumption or termination of the PE based on the input.

2. The system of claim 1 wherein (d) further comprises: a listing of the contents of a folder wherein the monitoring library rewrites the list of available folders, removing any folder the PE in question is not authorized to view to form an altered list and allowing the PE in question to resume using the altered list.

3. The system of claim 1 wherein (d) further comprises: when the PE attempts to directly access a folder the monitoring library intercepts the PE and returns a not found result to any PE attempting to access a folder it is not authorized to view and allows the PE in question to resume so that it receives a notice the folder was not found.

4. The system of claim 1 wherein (e) further comprises: raising of an Administrator's App, alerting an administrator of issue and requesting an administrator's decision for an intercepted action and responding to an input, allowing the PE to continue to process the intercepted action.

5. The system of claim 4 wherein claim 4 further comprises:
   receiving input via the Administrator's App to block an action responsive to the input.

6. The system of claim 4 wherein claim 4 further comprises:
   receiving input via the Administrator's App to terminate the PE in question immediately.

7. The system of claim 1 wherein (e) further comprises:
   raising of an interface to an end user, alerting the user to the issue and requesting the user's decision for the intercepted action and responsive to the input, allowing the PE to continue to process the intercepted action.

8. The system of claim 7, wherein claim 7 further comprises:
   receiving input via the interface from the end user to block the action responsive to the input.

9. The system of claim 7 wherein claim 7 further comprises:
   receiving input via the interface from the end user to terminate the PE in question immediately.

10. The system of claim 1 wherein (a) further comprises:
    identifying, by the hardware processor, one or more processes, including a parent process, initiated from the PE.

11. The system of claim 10 further comprising:
    associating the one or more processes with the PE for the purpose of inheriting permissions from the parent process in the case of a known manufacturer with a known and valid signature or other means of valid identification.

12. The system of claim 1, wherein (a) further comprises:
    tracking, by the hardware processor, actions of the PE and response of the user and/or administrator.

13. The system of claim 1 wherein the PE's state is one of paused or unpaused by the hardware processor.

14. The system of claim 1 further comprising:
    receiving, by the hardware processor, from a central server a predetermined list of permissions as pertaining to PE installed on the computer.

15. The system of claim 1 further comprising:
    obtaining, by the client service, from storage of the computer a list of permissions as pertaining to PE installed on a local computer.

16. The system of claim 1 further comprising:
    transmission of all permissions back to a central server for use in assisting sites with automatic configuration based on industry standards.

17. A method for providing sequestration of files and folders on a need-to-know basis based on the actions associated with file extensions and folder names, said method comprising the steps of:
    (a) monitoring, by a hardware processor on a computer, process execution of a portable executable (PE);
    (b) detecting, by monitoring library, that the PE is attempting to access a protected asset in a monitored manner;
    (c) immediate suspending of all processing for the PE in question;
    (d) intercepting, by the monitoring library the event of the action prior to the action taking place;
    (e) automatically determining disposition of the attempted file or folder and taking an automated action to allow, alter the list or terminate the PE;
    (f) in some instances, where a PE is accessing a file in a manner whereby the system is instructed to inquire as how to handle the event, displaying a user interface to receive an input whether to take the action, or block the action; and
    (g) resuming or terminating of the PE based on the input.

18. The method of claim 1 wherein step (d) further comprises:
   listing of the contents of a folder wherein the monitoring library rewrites the list of available folders, removing any folder the PE in question is not authorized to view to form an altered list and allowing the PE in question to resume using the altered list.

19. The method of claim 1 wherein step (d) further comprises:
   when the PE attempts to directly access a folder the monitoring library intercepting the PE and returning a not found result to any application attempting to access a folder it is not authorized to view and allows the PE in question to resume so that it receives a notice the folder was not found.

20. The method of claim 1 wherein step (e) further comprises:
   raising of an Administrator's App, alerting an administrator of issue and requesting an administrator's decision for an intercepted action and responding to an input, allowing the PE to continue to process the intercepted action.

* * * * *